(12) United States Patent  
Dias

(10) Patent No.: US 6,169,651 B1
(45) Date of Patent: *Jan. 2, 2001

(54) PROTECTIVE RELAY WITH MODULAR CONTROL PANEL

(75) Inventor: Clive Dias, Pickering (CA)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/090,957

(22) Filed: Jun. 5, 1998

(51) Int. Cl.[7] .................................................. H02B 1/00
(52) U.S. Cl. .................................... 361/206; 361/819
(58) Field of Search .................... 361/206, 728–731, 361/819; 335/132, 202

(56) References Cited

U.S. PATENT DOCUMENTS

| | | | |
|---|---|---|---|
| 3,763,400 | * 10/1973 | Layton et al. | 361/729 |
| 4,742,428 | 5/1988 | Conrad | 361/336 |
| 4,870,531 | * 9/1989 | Danek | 361/93 |
| 5,095,403 | * 3/1992 | Pin et al. | 361/356 |
| 5,185,705 | * 2/1993 | Farrington | 361/115 |
| 5,488,338 | * 1/1996 | Seymour et al. | 335/132 |
| 5,490,086 | * 2/1996 | Leone et al. | 361/728 |
| 5,786,987 | * 7/1998 | Barbier et al. | 361/728 |
| 5,877,691 | * 3/1999 | Suptitz et al. | 361/87 |
| 5,949,640 | * 9/1999 | Cameron et al. | 361/730 |

FOREIGN PATENT DOCUMENTS

2515152A1 * 10/1976 (DE).
4121610A1 * 1/1993 (DE).
0351060A2 * 1/1990 (EP).

* cited by examiner

Primary Examiner—Fritz Fleming
(74) Attorney, Agent, or Firm—Hunton & Williams; Thomas M. Blasey; Carl B. Horton

(57) ABSTRACT

A modular control panel for a protective relay. The control panel is removably attached to the housing of the protective relay, and the control panel has a frame which can be arranged to receive a plurality of independently replaceable control panel modules in either a horizontal or vertical orientation. The control panel can be removed from the protective relay housing and remotely mounted, while remaining operatively connected to the protective relay.

25 Claims, 4 Drawing Sheets

PROTECTIVE RELAY WITH MODULAR CONTROL PANEL

FIELD OF THE INVENTION

The present invention relates to protective relay devices for providing protective control in electrical distribution systems. More particularly, the present invention relates to a protective relay device having a modular control and display panel.

BACKGROUND OF THE INVENTION

Protective relay devices are necessary elements of an electrical power distribution system, as they provide a variety of protection and control functions. Protective relays monitor conditions in the power distribution system and operate circuit breakers in response to the detection of adverse conditions, thereby protecting various segments and components of the power distribution system from damage.

Older protective relays were analog devices, which have been largely replaced by digital protective relays. Digital protective relays include digital processing circuitry which can be programmed to provide a wider variety of protection and control functions than were available with analog relay devices.

Digital protective relays typically include a front panel for providing display and control functions. Such panels are typically fixed, in a secure and relatively permanent manner, to the protective relay circuitry. Because they are fixed to the relay circuitry, conventional control and display panels are of limited utility. For example, space considerations in a power distribution substation sometimes make it desirable for protective relays to have either a horizontal or vertical orientation; conventional protective relays are restricted to one orientation, as the control panel is fixed to the protective relay device during assembly. Further, because the control panel is fixed in a conventional protective relay, relay monitoring and control must be performed by a technician at the protective relay device, rather than at some distance from the protective relay device.

U.S. Pat. No. 4,742,428 to Conrad discloses a protective relay which includes an operating unit that can be withdrawn from an insulating housing through an opening in the front of the housing. The withdrawability of the protective relay circuitry allows for routine testing, maintenance, and replacement of the internal relay circuitry with minimal disruption of the power distribution system. However, the control panel of the Conrad protective relay is shown as being fixed to the relay processing circuitry, and is not shown or described as being removable, capable of multiple orientations, or remotely mountable.

Accordingly, it would be desirable for a protective relay to have a more functional control panel which would alleviate the limitations of conventional fixed control panels, and enhance the functionality of the protective relay device.

SUMMARY OF THE INVENTION

The present invention solves the above-described problems, and achieves additional advantages, by providing for a protective relay device having a modular control panel comprised of a frame with removable support struts, a display board, and a rear cover. The control panel is securely mountable in a protective relay housing, and the support struts define a plurality of module spaces into which a plurality of control panel modules can be removably mounted. The control panel modules are independently removable and replaceable by substitute modules to allow the control panel to be easily modified or upgraded. The control panel modules can be mounted in multiple orientations, by changing the orientation of the support struts, and hence the module spaces allowing the control panel to be reconfigurable for horizontally or vertically oriented protective relay devices. Further, the control panel is hinged, to facilitate access to the digital relay processing circuitry, and is removable and remotely mountable to allow the protective relay to be remotely controlled and monitored. The control panel modules can include any one or more of indicators, meters, a display, a keypad, and external connections for receiving data or electrical power. As will be described in more detail below, a modular control panel according to the present invention greatly improves and enhances a protective relay device.

BRIEF DESCRIPTION OF THE DRAWINGS

To promote a more complete understanding of the invention, the following Detailed Description discusses illustrative implementations of the invention, referring to the accompanying drawings, in which like reference indicia designate like elements, and in which.

DETAILED DESCRIPTION

Figure 1A:
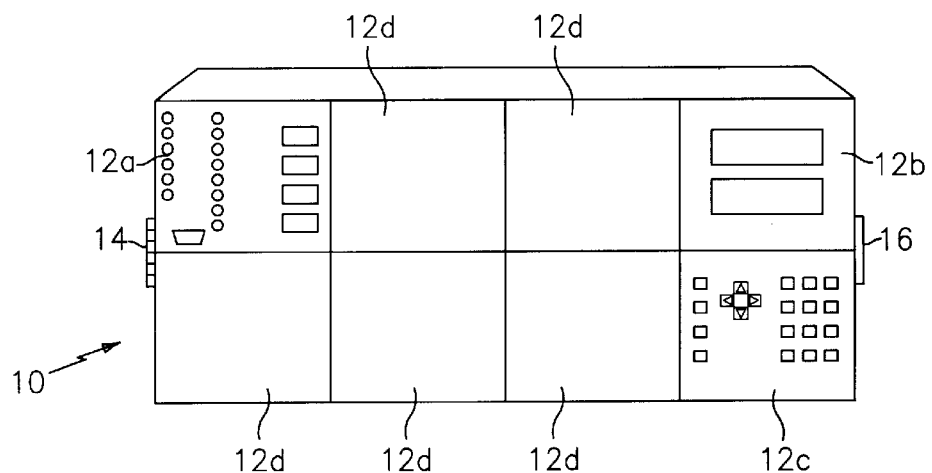
FIGS. 1a–b are an examples of a horizontally-oriented protective relay and a vertically-oriented protective relay, respectively, each including a modular protective relay control panel according to an embodiment of the present invention.
Figure 1B:
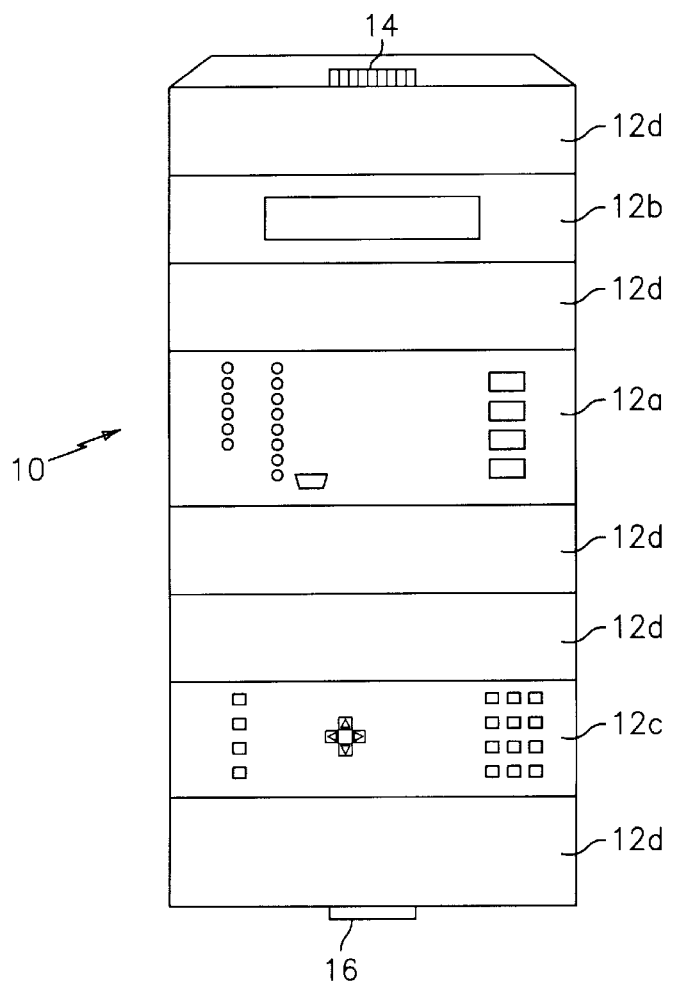

FIG. 1a is a front view of a horizontally-oriented protective relay device including a modular protective relay control panel according to the present invention. The control panel 10 includes a plurality of modules, including an indicator module 12a, a display module 12b, a keypad module 12c, and blank modules 12d. The control panel is preferably removably connected to the protective relay housing by at least one hinge 14 at one end of the control panel, and by a suitable latch 16 at the other end of the control panel. By providing a removable connection to the protective relay, the control panel can be opened to facilitate access to the protective relay processing circuitry contained inside the protective relay housing. It will be appreciated that the hinge 14 can be dispensed with and replaced by another latch or other connection means which allows the control panel to be opened. As will be shown and described in greater detail below, each module is independently removable and replaceable by a substitute module, which can perform the same or different functions, thereby rendering the modules interchangeable. Further, the relay can be configured with a vertical orientation as shown in FIG. 1b, where the modules are oriented vertically.

Figure 2A:
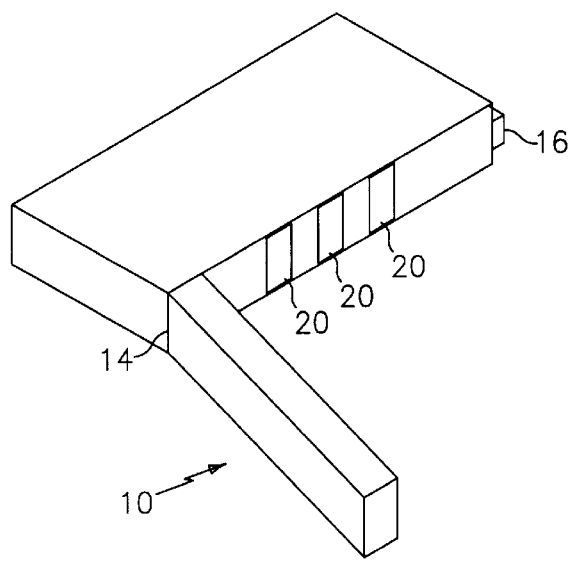
FIGS. 2a–b show an exemplary modular protective relay control panel which is attached to a protective relay by a hinge, in a partially open state, and an exemplary control panel which has been detached from the protective relay, respectively.

FIG. 2a shows a protective relay with a partially open control panel which facilitates access to the relay processing circuitry of the protective relay device. The control panel of the present invention is particularly useful with a modular protective relay device in which relay processing circuitry is embodied in a plurality of replaceable modules 20, as the hinge or other removable connection means allows relay processing modules to be easily removed and replaced.

Figure 2B:
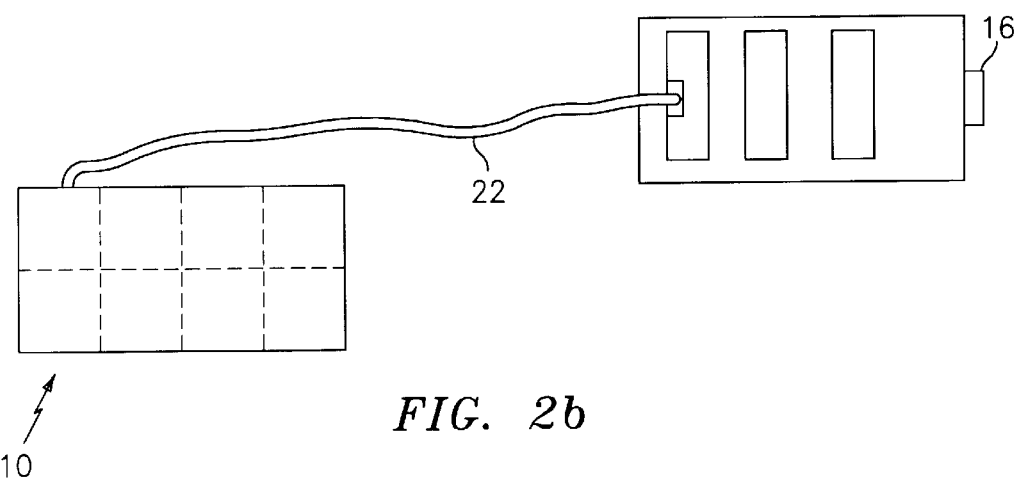

FIG. 2b shows a control panel 10 according to the present invention which has been detached from the protective relay device by, e.g., lifting the control panel off the hinge or hinges 14, or removing the panel from latch or latches 16. The detached control panel is operatively connected to the protective relay device, in this example by a cable 22 suitable for exchanging power and communication signals between the control panel and the protective relay processing circuitry. In one embodiment of the present invention, the cable 22 is an 8-wire shielded twisted pair cable terminated by RJ45 connectors which connect to RJ45 receptacles located in the rear cover of the control panel and at a suitable location in the protective relay. The detached panel can be mounted, either vertically or horizontally, on a remote panel (not shown) with other detached panels to allow a user to monitor and control the protective relay device remotely.

Figure 3:
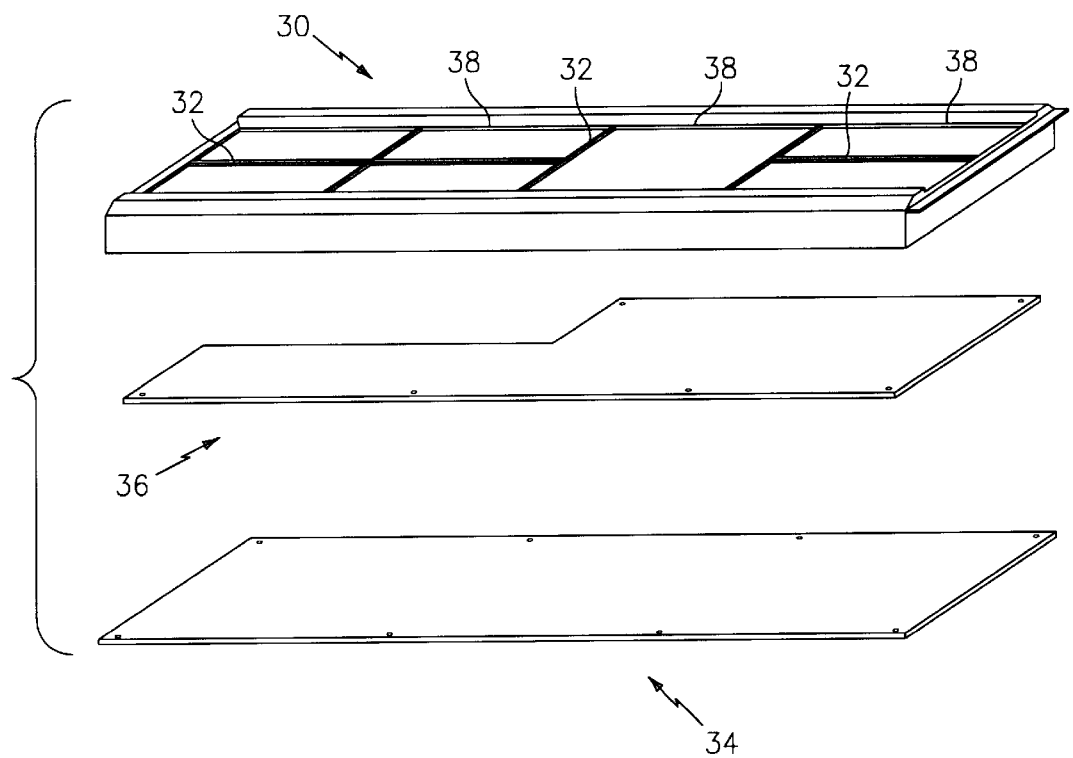
FIG. 3 is a diagram of a control panel according to an aspect of the present invention.

FIG. 3 shows an exploded view of an exemplary control panel according to the present invention. The control panel of FIG. 3 includes a main plastic frame 30, support struts 32, a rear cover 34, and a display board 36. The display board 36 is held between the main plastic frame 30 and the rear cover 34. The frame 30 is in this example substantially rectangular in shape. The support struts 32 span the width of the frame 30, and notches 38 are provided in the supports 32 and in the edges of the frame 30. The notches 38 are capable of receiving removable supports which define spaces for control panel modules. Because notches are provided in both the supports 32 and the edges of the frame 30, the removable supports can be inserted at different orientations. By changing the orientation of the removable supports, the orientation of the defined spaces can be changed. Each defined space can receive a control panel module; thus, by changing the orientation of the defined spaces, the orientation of the control panel modules, and of the protective relay device, can be changed. For example, if removable supports are inserted in the notches 38 such that the removable supports are parallel to the supports 32, the control panel is configured for a vertical orientation of (in this example) eight vertically arranged module spaces, as shown in FIG. 1b. If removable supports are inserted in the notches 38 such that the removable supports are perpendicular to the supports 32, the control panel will be configured for a horizontal orientation of (in this example) two rows of four horizontally arranged module spaces, as shown in FIG. 1a.

Figure 4:
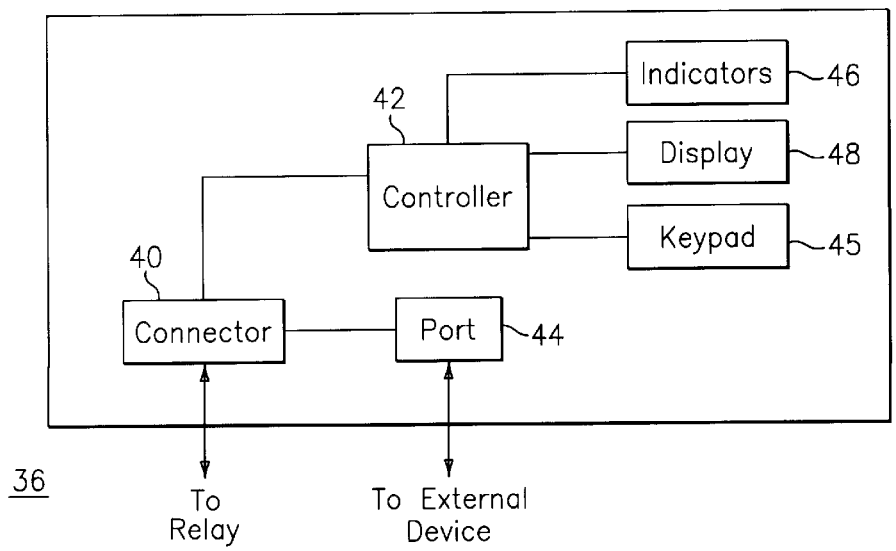
FIG. 4 is a block diagram of the display board component of the control panel of FIG. 3.

FIG. 4 is a block diagram of the control panel display board 36. The display board 36 includes a connection 40 to the relay processing circuitry, a controller 42 for controlling the various display and indicator functions on the control panel, a serial port connection 44 for exchanging power and data signals with a device external to the protective relay, a keypad 45 for inputting control information to the protective relay processing circuitry via the controller 42, a modular indicator array 46 comprised of, e.g., LEDs which are selectively illuminated under the control of controller 42, and display circuitry 48 which can display a variety of information to a user.

Figure 5A:
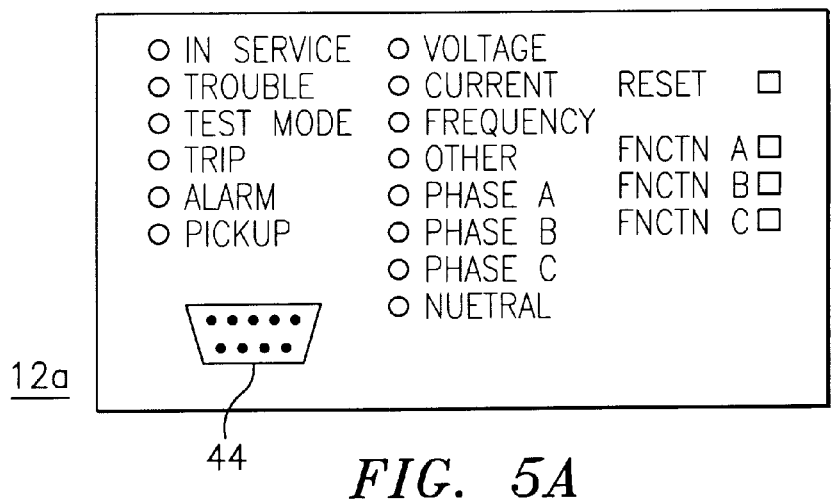
FIGS. 5a–5c are diagrams of exemplary control panel modules according to the present invention.
Figure 5B:
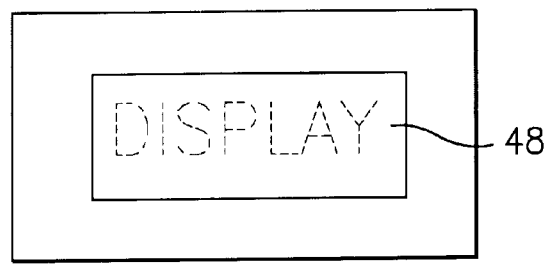
Figure 5C:
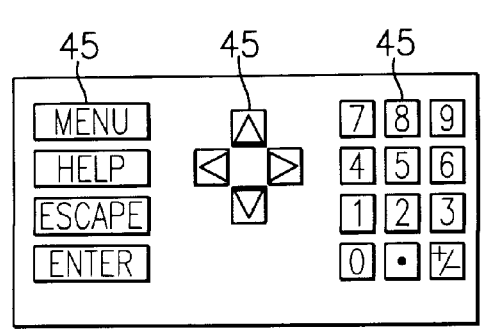

FIGS. 5a–c show various exemplary modules which can be individually inserted and removed from the module spaces defined in the frame 30. Each module can perform a specific function or set of functions. FIG. 5a shows an LED indicator module 12a which is operatively connected to the modular indicator array 46 and which includes, for example, status and event LED indicators. Status indicators can include an "IN SERVICE" indicator to indicate if the protective relay is operating properly; a "TROUBLE" indicator to indicate if the protective relay's self test operation has detected a problem; a "TEST MODE" indicator to indicate if the relay is currently in a test mode; a "TRIP" indicator to indicate that the protective relay has issued a trip command; an "ALARM" indicator to indicate that an alarm condition is present; and a "PICKUP" indicator to indicate that the protective relay has detected a pickup condition.

Event indicators can be provided to indicate the cause or source of a detected condition of the power distribution system. The event indicators can include: a "CURRENT" indicator to indicate that the event was caused by a current condition; a "VOLTAGE" indicator to indicate that the event was caused by a voltage condition; a "FREQUENCY" or "OTHER" indicator to indicate a frequency-related or other condition; phase indicators "PHASE A", "PHASE B", "PHASE C", and "NEUTRAL/GROUND" to indicate which phase(s) were involved in a detected fault. Of course, it will be appreciated that other suitable status conditions and events can be indicated by the indicators. In one embodiment of the present invention, the indicators receive light, from light sources contained in the relay processing circuitry, via light pipes (not shown) which extend from the back of the control panel module between the indicators and the modular indicator array 46. The light pipes can be formed as clear tubes of plastic, glass, or other suitable material.

The indicator module 12a of FIG. 5a is shown as including a serial port 44. It should be appreciated that the serial port 44 can alternatively be provided in a separate module. The serial port 44 is preferably capable of receiving power and data signals, and can be implemented as a RS-232 serial port. The serial port 44 enables a user to connect an external device, such as a personal computer, for downloading settings, monitoring data, generating sequence of events reports, providing oscillographs, or performing other functions relating to monitoring, programming, and control of the protective relay.

The indicator module 12a of FIG. 5a is also shown as including a reset button and various function buttons. These buttons are operatively connected to the processing circuitry of the protective relay device (e.g., via the controller 42 shown in FIG. 4), and can be used to reset the device and clear the status and event indicators.

FIG. 5b shows a display module 12b which includes a display 48 operatively connected to the processing circuitry of the protective relay. Preferably, the display 42 is a vacuum flourescent display or other suitable display which is viewable in relatively dim lighting from a wide variety of viewing angles. The display 42 can provide more detailed information, including text messages or digital meter information, to a user monitoring the protective relay, and can be used to provide feedback to a user programming the protective relay device. To extend the life of the vacuum flourescent display and avoid screen "burn-in", the relay processing circuitry is preferably provided with a screen saver, which can scroll messages across the display screen or cause the display screen to go blank after a predetermined period of time.

FIG. 5c shows a keypad module 12c which includes a keypad 45 which is operatively connected with the processing circuitry of the protective relay (e.g., via the controller 42). The keypad can include numeric keys and/or command keys which allow a user to program the protective relay. The user can receive feedback from a display module as shown in FIG. 5*b*.

The control panel modules of FIGS. 5*a–c* are examples only, and it will be appreciated that other suitable modules will be contemplated by those of ordinary skill in the art. For example, one or more modules can include liquid crystal display meter. Further, blank modules can be provided in the module spaces where modules are not required.

While the foregoing description includes many details and specificities, it is to be understood that these are included for illustrative purposes only, and are not limitations of the invention. The embodiments described above can be modified in numerous ways without departing from the spirit and scope of the invention, as defined by the following claims and their legal equivalents.

What is claimed is:

1. A control panel for a single protective relay in an electrical distribution system, comprising:
   a frame which is securable to a housing containing said single protective relay, the frame defining a plurality of module spaces; and
   a plurality of interchangeable modules for providing control and display functions for said single protective relay,
   wherein each module is securable in, and independently removable from, the module spaces, and is replaceable by a substitute module.

2. The control panel of claim 1, wherein the control panel is removably attached to the protective relay housing via at least one hinge, located at one end of the control panel, and a latch located at a second end of the control panel.

3. The control panel of claim 1, wherein the control panel is removable from the protective relay housing, and is connected to said protective relay via a communication cable.

4. The control panel of claim 3, wherein the communication cable is an 8-wire shielded twisted pair cable terminated with RJ45 connectors.

5. The control panel of claim 3, wherein the modules can be attached to the module spaces in one of at least two orientations with respect to the housing, and wherein a first orientation is a horizontal orientation, and a second orientation is a vertical orientation.

6. The control panel of claim 1, wherein at least one module includes a vacuum flourescent display.

7. The control panel of claim 6, wherein the vacuum flourescent display is provided with a screen saver.

8. The control panel of claim 7, wherein the screen saver cycles through messages to avoid burn-in.

9. The control panel of claim 7, wherein the screen saver blacks out after predetermined time to avoid burn-in.

10. The control panel of claim 1, wherein at least one module includes a keypad.

11. The control panel of claim 1, wherein at least one module includes one or more status indicators.

12. The control panel of claim 11, wherein the status indicators comprise light pipes which are aligned with light sources contained in the relay housing.

13. The control panel of claim 1, wherein at least one module includes at least one serial port for receiving power and data signals.

14. The control panel of claim 13, wherein the serial port is an RS-232 port.

15. The control panel of claim 13, wherein the data signals communicate between the protective relay and a remote monitoring and control device.

16. The control panel of claim 1, wherein at least one module includes a LCD meter.

17. The control panel of claim 1, wherein:
   said frame includes a plurality of support struts, wherein said module spaces are defined by said frame and said plurality of support struts; and
   said support struts having first and second ends,
   wherein said support struts are moveable to a plurality of positions within said frame to modify the location and orientation of said module spaces.

18. The control panel of claim 17, wherein said frame includes a plurality of opposed notches for receiving said first and second ends of said support struts.

19. A protective relay, comprising:
   a relay housing containing relay processing circuitry; and
   a single control panel having a frame mounted on the housing,
   wherein the single control panel is configurable to receive a plurality of interchangeable control panel modules.

20. The protective relay of claim 19, wherein the control panel is removably attached to the relay housing.

21. The protective relay of claim 20, wherein the control panel is removably attached by at least one hinge.

22. The protective relay of claim 20, wherein the control panel is removably attached by at least one latch.

23. The protective relay of claim 20, wherein the control panel is operatively connected to the relay processing circuitry via a communication cable.

24. The protective relay of claim 20, wherein the control panel frame can be configured to accept the control panel modules in more than one orientation with respect to the housing, a first orientation being a horizontal orientation, and a second orientation being a vertical orientation.

25. The protective relay of claim 19, wherein the control panel modules include at least one of:
   an indicator array, a display, a key pad, and a meter.

* * * * *